Jan. 2, 1940.  O. L. KETTENBACH  2,185,408
SEED TREATING MACHINE
Filed Oct. 14, 1936  2 Sheets-Sheet 1
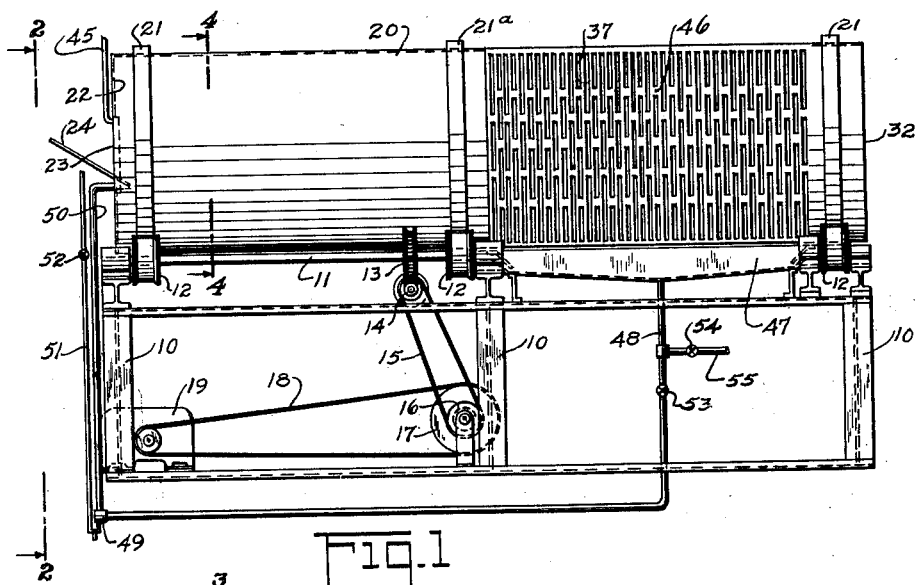
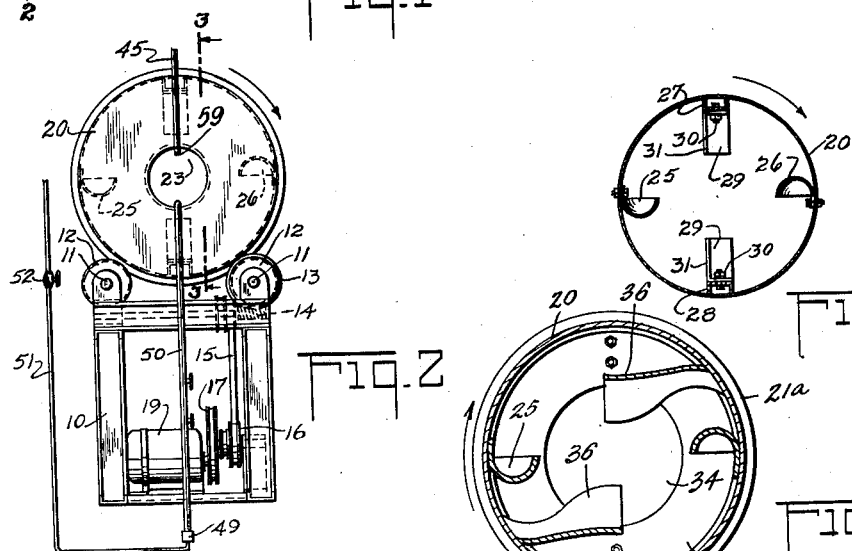
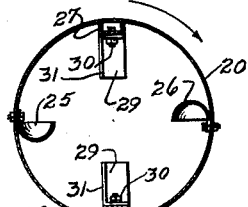
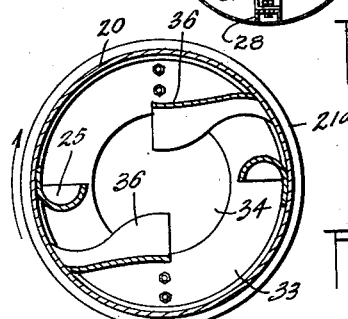
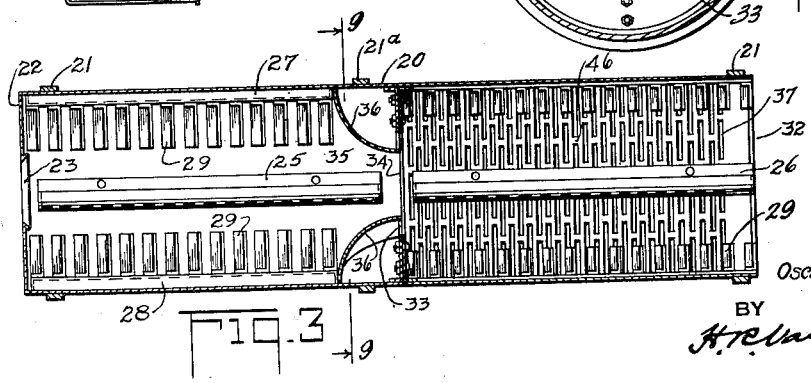
INVENTOR
Oscar L. Kettenbach.
BY
ATTORNEY Jan. 2, 1940.　　　　O. L. KETTENBACH　　　　2,185,408
SEED TREATING MACHINE
Filed Oct. 14, 1936　　2 Sheets-Sheet 2
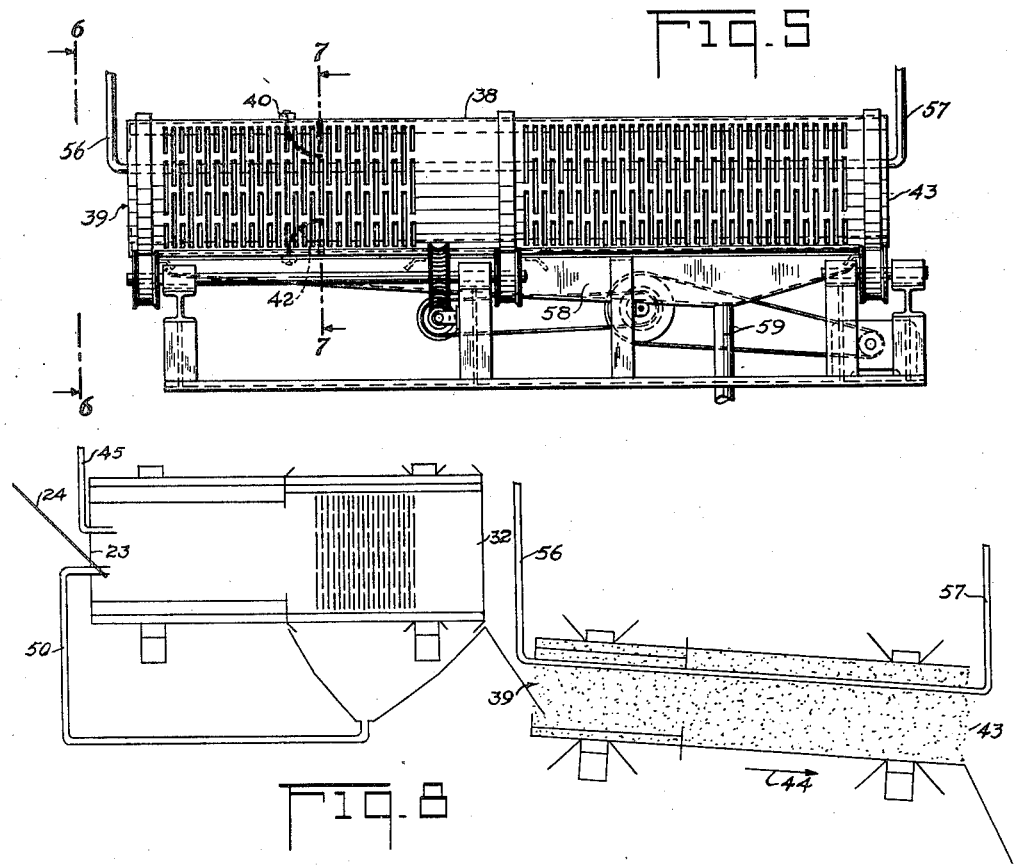
INVENTOR
Oscar L. Kettenbach
BY
ATTORNEY Patented Jan. 2, 1940

2,185,408

UNITED STATES PATENT OFFICE 2,185,408

SEED TREATING MACHINE

Oscar L. Kettenbach, Tucson, Ariz., assignor to Chemical Seed Treating and Delinting Corporation, a corporation of Arizona Application October 14, 1936, Serial No. 105,457

1 Claim. (Cl. 83—28)

This invention relates to a seed treating machine and has for an object the provision of a simple, efficient and automatic mechanism in which seeds may be treated by having applied thereto any desired liquid to remove fungus, bacteria or the like.

Another object of the invention is to provide an automatic mechanism for delinting cottonseed in which the seeds are completely delinted by acid and the resultant residue and all traces of acid are removed and the delinted seed washed and delivered out of the machine clean and ready for use.

Other objects of the invention such as recirculation of the liquid used in treating the seed, the simplified construction of the apparatus such as the simplified means employed for conveying the seed through the treating and washing drums and the like, will be apparent from the following specification and finally pointed out in the appended claim.

In order to describe a preferred embodiment of the invention, reference is made to Patent No. 1,960,692, patented May 29, 1934 to James G. Brown and Rubert B. Streets for Apparatus for treating seeds in which patent is disclosed a machine particularly adapted for delinting cottonseed.

The present application shows an improved machine for carrying out the process of delinting cottonseed as generally outlined in the aforesaid patent and may be said to constitute an improvement over the machine therein described.

The invention is illustrated in the accompanying drawings, in which like parts are indicated by the same numerals; and in which:

Figure 1 is a side view of the treating drum of a machine embodying the invention;

Figure 2 is an end view of the drum, Figure 1;

Figure 3 is a view, partly in section, on the line 3—3, Figure 2;

Figure 4 is a sectional view on the line 4—4, Figure 1;

Figure 5 is a side view of the washer drum of a machine embodying the invention;

Figure 6 is an end view of the drum, Figure 5;

Figure 7 is a view, partly in section, on the line 7—7, Figure 5;

Figure 8 is a diagrammatic view of the drums, Figures 1 and 5, as arranged for cooperative operation to form a complete machine to carry out the invention; and Figure 9 is a cross sectional view of the treating drum in the plane 9—9, Figure 3.

The numeral 10 denotes a suitable supporting frame or cradle which may be made of wood or iron, preferably painted or treated to be acid or moisture proof. Journaled in this frame in any suitable manner, are two parallel oppositely disposed shafts 11, 11, each shaft having secured thereto so as to turn therewith, a number of flanged wheels or rollers 12, 12. At least one of said shafts has secured thereto a worm wheel 13 which is driven by a worm 14 suitably supported on a horizontal shaft mounted in suitable bearings in the frame 10, said shaft having thereon a pulley which may be driven by a belt 15 and a pulley 16 carried on a shaft driven by pulley 17 and which via belt 18 is driven from a suitable source of power such as the electric motor 19 which may be mounted on the bottom members of the frame as shown in Figures 1 and 2.

An open ended horizontal rotary treating drum, which for cottonseed would be 2' in diameter and 12' long, is placed on the rollers 12 as shown in Figures 1 and 2. This drum may have an outer shell 20 which may be made in one piece or this shell may be made in two or more sections suitably bolted together and is preferably made of metal. Secured to the outside of said shell are the bands or tracks 21 which are of proper width to fit between the flanges on the rollers 12, thereby preventing any horizontal movement of the drum.

It will be apparent that if the rollers 12 are revolved by means of power applied thereto via motor 19 and its associated belts and pulleys, that the treating drum will be revolved on the cradle, the weight of the drum especially when containing seed holding the drum firmly in contact with the wheels 12 so that it will be revolved thereby, and that the rotative speed of said drum can be controlled within any reasonable limits. It has been found that for delinting cottonseed, a speed of from fifteen to forty-five revolutions per minute gives satisfactory results.

The treating drum is provided with a head 22 having an inwardly flanged aperture therein as shown at 23, into which seed may be introduced from a hopper or the like via the chute 24. To the interior of the drum is secured in any suitable manner such as by ordinary machine bolts, a pair of curved blades 25, 26 for the purpose to be presently described, and to the interior of the drum is also secured in any suitable manner, as by welding, a pair of supports, 27, 28, and on each of these supports is mounted a plurality of adjustable fins 29 secured thereto in any suitable manner, such as by bolts 30; so that the fins can have their faces 31 inclined at any desired angle in order to engage seed as the drum 20 rotates, and move or urge the same along from the inlet 23 toward the outlet end 32 of the tank 20.

The first section of the drum 20 between the inlet 23 thereof and the center band 21a is solid without any perforations or openings whatever and at the end of this solid section within the tank may be placed a center wall or partition 33 dividing the drum into two longitudinal sections. This wall has an opening 34 therein into which seed is delivered from the interior 35 of the first section of the tank into the second section thereof and in order to facilitate this transfer of seed into the opening 34 a pair of baffle plates 36, 36 are arranged as shown in Figure 3 by being suitably secured to the interior of the drum 20 and these plates are so shaped that the seed in the interior 35 of this first section being urged therethrough by the curved blades 25, and the adjustable fins 29, finally pass through the opening 34 into the second section of the drum. The second section of the drum 20 is provided with the same arrangement of curved blades 26 and the adjustable fins 29 as the first section, but the outer wall of the drum of the second section is perforated in any suitable manner. These perforations may be holes but if so, these should be flanged inwardly in order that seed may not lodge therein, and the diameter of these holes will depend on the size and character of seed to be treated. Slots are preferred to holes and these slots for cottonseed may be approximately 1/16 of an inch wide and permit a liquid to drain off the seed in a manner to be presently described.

These slots are generally indicated in Figures 1 and 3 by the numeral 37 and the showing of the slots in these figures is purely diagrammatic and are not to scale.

The washer, as shown in Figures 5, 6 and 7 for use with the treating apparatus previously described is substantially identical with the treating apparatus in all respects in so far as the construction of the cradle or supporting frame and the driving mechanism is concerned. A separate motor may be employed to drive the washing drum although it is obvious that by suitable gearing or other connections, both drums can be driven from the same source of power. The diameter and length of the washing drum are substantially the same as the treating drum but the washing drum may be revolved at from 15 to 30 R. P. M., as the speed of the washer can be less than that of the treating drum.

The washing drum, generally denoted by the numerals 38 is preferably divided in sections and has an inlet 39 adapted to communicate with the outlet 32 of the treating drum, and the section immediately adjacent this inlet 39 is perforated or slotted the same as previously described for the treating drum. By having this section removable from the balance of the drum, by bolting the sections together as indicated at 40, the first section may be readily replaced, which is desirable because it receives seed heavily charged with acid and the wear on this section of the washer is excessive as compared with the remaining sections.

The sections, if necessary, can be bolted together by means of an internal flange 41 to which may be bolted the baffle plates shown in dotted lines at 42, Figure 5, which plates serve to conduct the seed into the second compartment of the washer. It will be understood at this point that the washer may have as many sections or compartments as is found necessary and that these may have either slotted or imperforate walls, depending on the requirements of the seed to be treated.

At various places within the washer may be placed adjustable fins or flights 42 to aid in urging the seed from the inlet 39 to the outlet 43.

The treating and washing drums may be assembled to cooperate as shown in Figure 8, where the seed is discharged from the outlet 32 of the treating drum into the inlet 39 of the washing drum and discharged from the outlet 43 thereof. The entire washing drum mechanism shown in Figure 5 may be slightly inclined towards the outlet of the washer, as indicated by the arrow 44, Figure 8, and as before stated, both drums can be operated from the same source of power if that is desired.

In order to supply treating liquid and washing water to the apparatus, a supply pipe 45 projects into the inlet 23 of the treating drum and may extend part or all the way therethrough and the portion lying within the drum may be suitably perforated or provided with spray nozzles that will deliver the treating liquid to the seed. If the machine is used for delinting cottonseed a suitable acid is delivered to the seed through this pipe and due to the rotation of the drum and the urging forward of the seed therein by the action of the curved blades 25, 26 and the adjustable fins 29, the acid and seed are thoroughly mixed and cannot separate until the mixture is delivered via the baffle plates 36 to the perforated section of the drum which is generally indicated by the numeral 46, Figures 1 and 3. During the passage of the seed through this perforated section, the acid or mixture of water and acid or other treating fluid drains away from the seed and falls into the trough 47 from whence it is conveyed via the pipe 48 to any suitable means such as the air lift pump 49 which lifts the fluid via the pipe 50 which extends into the inlet of the drum and which in turn may extend therethrough, being perforated or provided with suitable spray nozzles so that the acid is again applied to the seed. This acid recovery system enables the acid to be used over and over again until it is spent. The pipe 51 provides pressure for the pumping means 49 which may be of any suitable character. A valve 52 in this pipe may regulate the pressure.

A valve 53 in the pipe 48 may be closed and spent acid drained through valve 54 out through the waste pipe 55. In the washing tank any suitable fluid can be used. In the case of delinting cottonseed water would be employed and a pipe 56 extends through the drum emerging at the outlet end thereof, as shown at 57. That portion of this pipe lying within the drum is perforated or provided with nozzles so that the liquid is sprayed on the seed as it is urged from the inlet to the outlet of the drum, the seed emerging from the outlet 43 thereof cleaned free from lint and thoroughly rinsed of all treating fluid.

The trough 58 is provided extending below the entire length of the washer 38 in order to catch the liquid draining therethrough and this trough may be provided with a pipe 59 to carry away the liquid.

The relative speed of the drums, the supply of treating and washing fluids thereto and the general operation of the device will depend largely on the character of the seed and the treating materials used, and the results to be obtained, and are readily determined from a brief experimental run of the apparatus.

It will be observed that the construction of the apparatus herein disclosed eliminates the necessity of inclining the treating drum and the use of any separately driven paddles, screw conveyors or other devices within the drums to move the seed therethrough, together with all of the bearings, gears, belts, chains or other devices necessary when such means for moving the seed is employed, and that the apparatus will require a minimum amount of treating fluid which can be easily regulated, and while the apparatus is herein described mainly as applied to delinting cottonseed, it is obvious that it may be employed to delint or treat other seeds for any purpose where seeds are to be subjected first to treatment with a liquid and secondly to a washing treatment to remove or neutralize said liquid.

The feature of the perforated drums herein disclosed is not necessarily limited to rotary drums. This is particularly true of the treating drum or tank and this feature may be used in connection with treating drums similar to the treating tank 2 shown in the aforesaid Patent No. 1,960,692 to Brown et al. in which the tank is stationary and the seed is urged therethrough by means of a conveyor or series of paddles. This method of perforating the treating drum permits the escape of treating fluid therefrom and the reuse of said fluid and also enables the seed to be discharged from the treating drum and into the washer containing a minimum of treating fluid.

It will also be observed that the first section of the treating drum, Figure 1, is in effect a treating tank or trough, and the second or perforated section 46 thereof is a draining trough and that both said troughs are provided with means for agitating, advancing and discharging seed therefrom.

Although the invention has been disclosed in connection with the specific details of preferred embodiments thereof, it must be understood that such details are not intended to be limitative of the invention except in so far as set forth in the accompanying claim.

What is claimed is:

In a seed treating device, in combination, a circumferentially imperforate drum having an inlet end and an outlet end, means to deliver seed and acid into said inlet end, members secured to the interior surface of said drum for mixing said seed and said acid and feeding the resultant mixture toward said outlet end, an annular baffle in said outlet end having a central outlet opening formed therein, a plurality of inclined baffle members having their outer ends secured to the inner periphery of said drum and their inner ends approximately in line with said opening, the active surfaces being curved to present a concave surface to the mixture at said periphery and a convex surface at said discharge opening, and side portions on said members projecting inwardly within the inner limits of said discharge opening, said baffle members also diverging rearwardly from said discharge opening whereby said baffle members may act upon the mixture in a direction opposite to the direction of the feed and cause it to form a heap extending above the lower edge of said discharge opening and to spill outwardly therefrom.

OSCAR L. KETTENBACH.